United States Patent [19]

Harbison et al.

[11] 4,056,309
[45] Nov. 1, 1977

[54] RENEWABLE SURFACE HELIOSTAT TYPE SOLAR MIRROR

[75] Inventors: Robert Campbell Harbison; Gerald Arthur Bradley; Paul Arthur Lux, all of San Diego, Calif.

[73] Assignee: General Dynamics Corporation, San Diego, Calif.

[21] Appl. No.: 682,911

[22] Filed: May 4, 1976

[51] Int. Cl.² .............................................. G02B 5/10
[52] U.S. Cl. .................................... 350/310; 126/270; 350/61; 350/289; 350/293
[58] Field of Search ...................... 126/270, 271, 141; 350/288, 292, 293, 295, 310, 320, 61, 308, 247, 289; 356/180, 181, 207

[56] References Cited

U.S. PATENT DOCUMENTS

| | | | |
|---|---|---|---|
| 2,800,127 | 7/1957 | Flynn, Jr. | 350/288 X |
| 2,825,326 | 3/1958 | Flynn, Jr. | 126/141 |
| 3,299,589 | 1/1967 | Hay | 52/71 |
| 3,406,404 | 10/1968 | Maier | 343/915 |
| 3,445,157 | 5/1969 | Zitter | 350/295 |
| 3,450,192 | 6/1969 | Hay | 126/270 X |
| 3,514,776 | 5/1970 | Mulready | 350/295 X |
| 3,526,772 | 9/1970 | Troll | 356/180 |
| 3,539,247 | 11/1970 | Broussard | 350/308 |
| 3,562,509 | 2/1971 | Kahl, Jr. | 350/61 |
| 3,597,281 | 8/1971 | Webb | 136/206 |
| 3,714,875 | 2/1973 | Yost, Jr. | 350/247 UX |
| 3,977,773 | 8/1976 | Hubbard | 350/292 |

OTHER PUBLICATIONS

Plisk, Xerox Disclosure Journal, vol. 1, No. 2, Feb. 1976, p. 101.

*Primary Examiner*—F. L. Evans
*Attorney, Agent, or Firm*—Brown & Martin

[57] ABSTRACT

A support surface having the shape of a desired mirror surface for use in reflecting solar light and a sheet of flexible mirror material with a portion covering the support surface. A reel device for selectively changing portions of the flexible mirror material on the support device, and a device for adhering the sheet of flexible material to the curvature and surface of the support surface. The mirror also includes devices for preventing wind lifting of the flexible material from the support surface and for correctly positioning the solar mirror relative to the sunlight.

22 Claims, 11 Drawing Figures

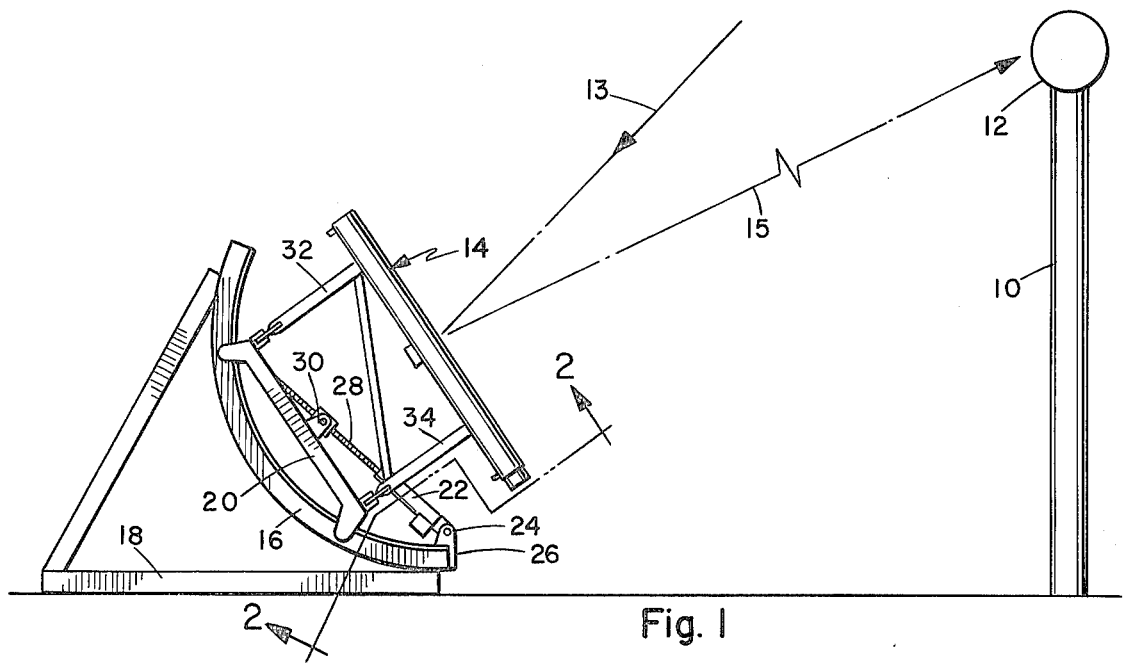
Fig. 1
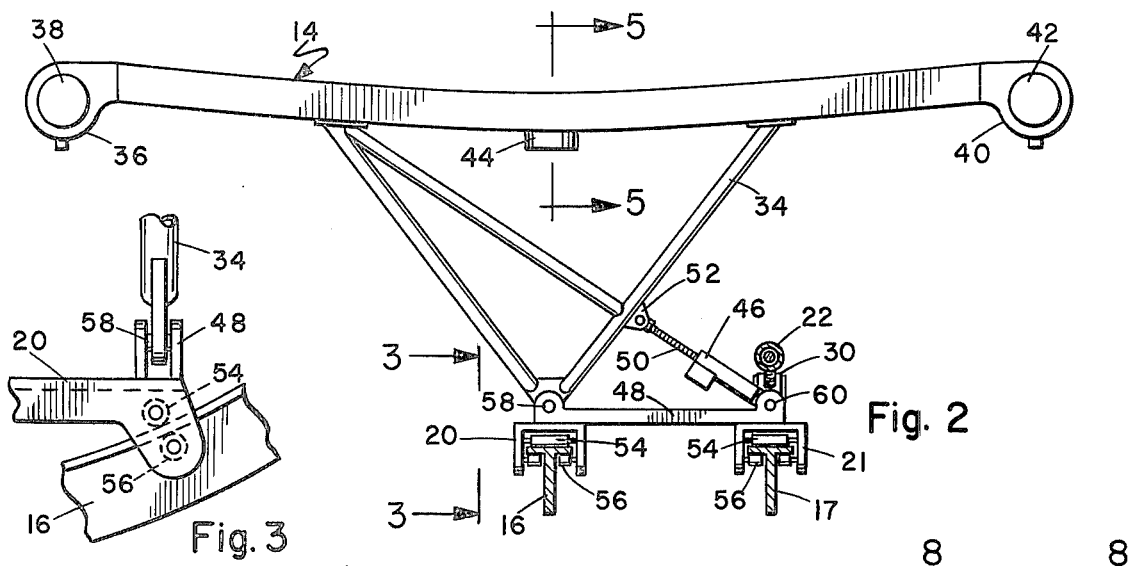
Fig. 2
Fig. 3
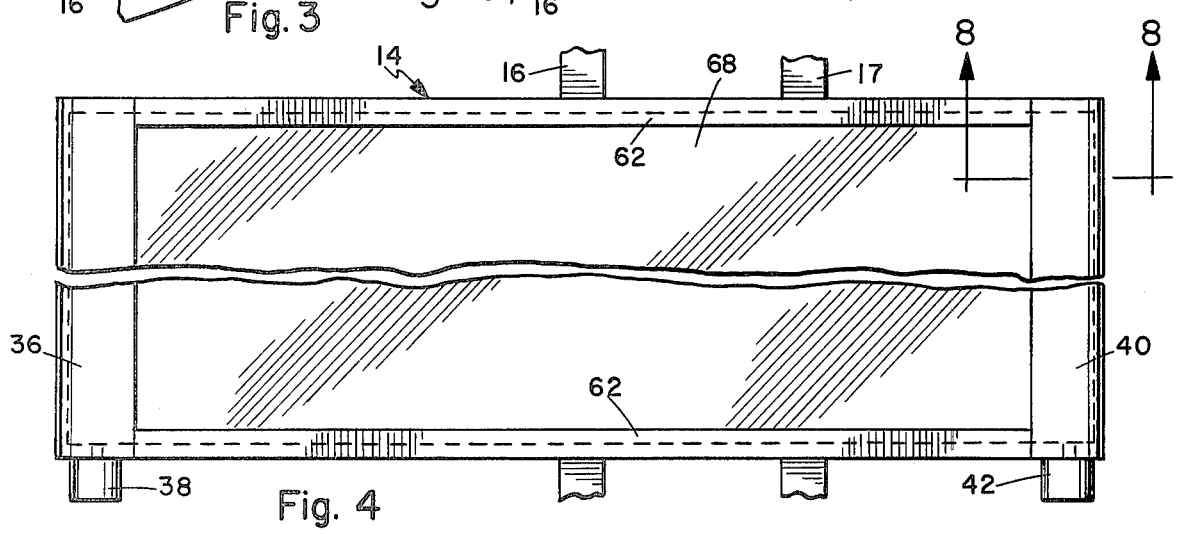
Fig. 4

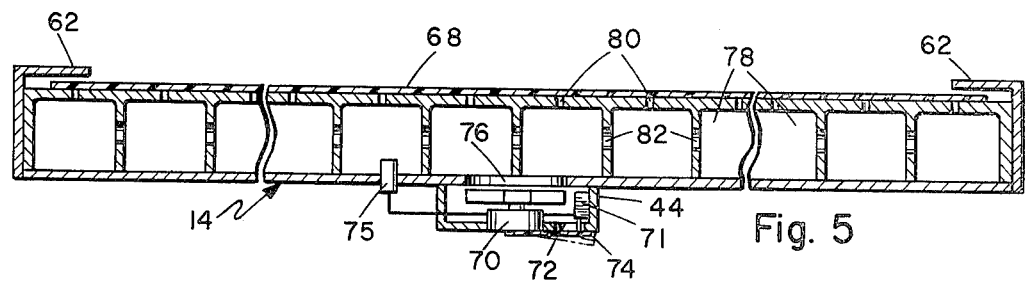
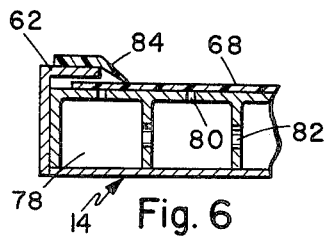
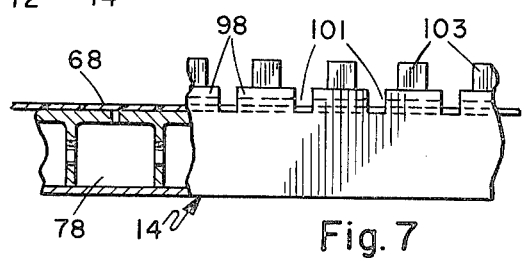
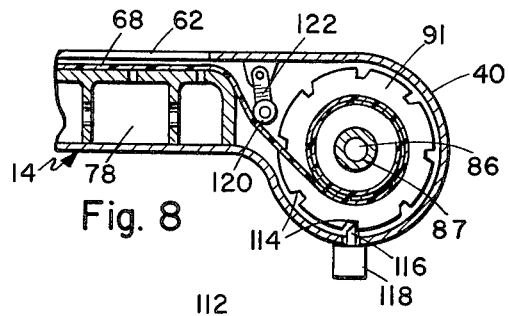
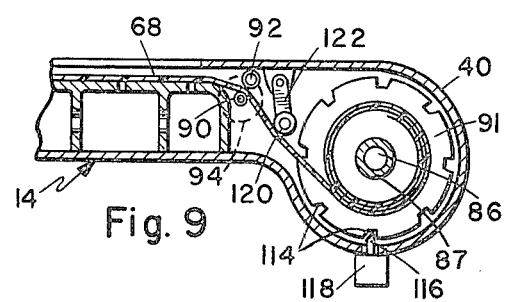
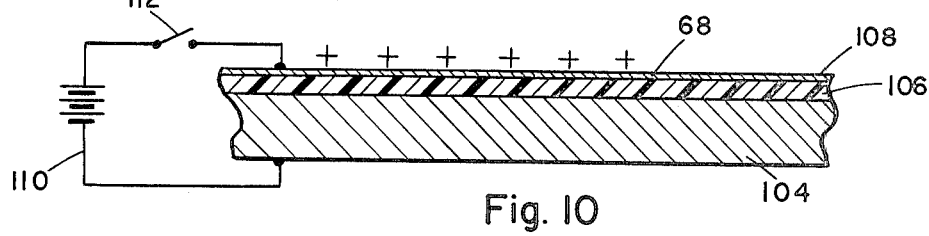
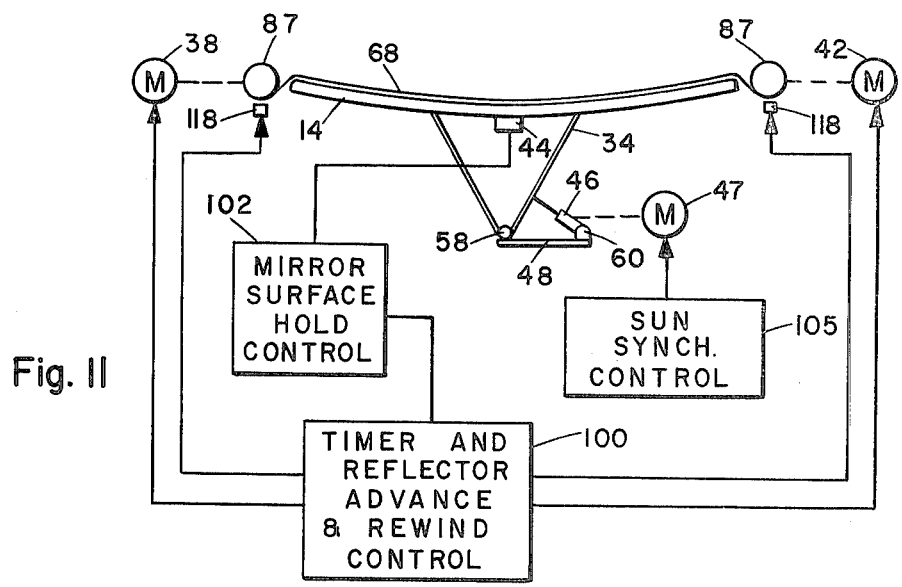

RENEWABLE SURFACE HELIOSTAT TYPE SOLAR MIRROR

BACKGROUND OF THE INVENTION

Arrays of mirrors of the heliostat type are being used to direct solar light to a receiver. To make utilization of solar energy practical, it is necessary that a large number of heliostats are used. Thus, a large number of mirrors surfaces must be constructed, arrayed, cleaned, protected from the elements and eventually replaced.

Mirror surfaces are expensive to construct to the desired configuration and the surfaces are oftentimes subject to destruction by the elements in a relatively short period of time. Mirror surfaces that are not subject to destruction in short periods of time are often prohibitively expensive and are required to be made from exotic and expensive materials. Yet even using these materials, the mirror surfaces have to be cleaned often because of the elements. Where the mirror surfaces may cover an area in the order of several acres, the task of maintaining the mirror surfaces in good condition, cleaning their surfaces and replacing the surfaces from time to time becomes prohibitively expensive.

Because of these limitations and because of the low power of solar energy, oftentimes the operational expenses involved in converting solar energy into usable power are so large that solar energy becomes a hopelessly non-competitive power source. It is therefore an advantage to have a renewable surface heliostat type solar mirror in which the surfaces can be kept reasonably clean and selectively replaced, in a manner that is less expensive than constructing and replacing expensive mirror surfaces and keeping the mirror surfaces clean.

SUMMARY OF THE INVENTION

In a preferred embodiment, a renewable surface heliostat solar mirror has a support means with a surface for supporting a sheet of flexible mirror material. The surface is a substantially planar surface that is curved for reflecting solar light to a receiver in a manner determined by the system and the focal length of the distance between the mirror and the receiver. The mirror material is a strong material that may, for example, be made of Mylar having a metalized or other suitable flexible mirror surface secured thereto. The mirror material is rolled onto and off of positioning reels that are positioned at opposite ends of the support surface.

A means is employed for adhering the flexible mirror material to the support surface. In one embodiment, this comprises a vacuum means that draws a vacuum through holes in the support surface thus creating a suction on the back side of the flexible mirror material, causing the mirror material to be drawn against the conform to the support surface. In another embodiment, an eletro static field is set up across the mirror material and the support surface, whereby the electro static field causes the sheet material to adhere to the support surface. In the latter embodiment, the polarity of the field is such that the mirror surface carries a charge that tends to repel the accumulation of dirt and other particles on the surface of the mirror, tending to keep the mirror surface clean or allowing the wind or other means to quickly and easily blow such dirt particles from the surface of the metalized mirror surface.

The support surface has a width that is only slightly larger than the width of the sheet of flexible mirror material. So means are provided along the edge of the support surface to prevent the wind from getting under the edge of the sheet material and lifting it from the support surface. Such means are provided in one embodiment by longitudinal lip or a resilient member secured to the lip that presses against the flexible mirror material preventing accumulation of dirt between the lip and the mirror material.

The support surface is supported by a triangular support that is pivoted at the apex of the triangle. A positioning device pivots the triangular support and the mirror at an angle on the pivot point, with a gradual movement that allows the mirror to track the movement of the sun. Also a pair of rails are provided for supporting the mirror in vertical movement, which gradually allows the mirror surface angle to be changed to provide optimum reflection of the solar energy to the receiver and yet maintain the correct focal length between the center of the mirror surface and the receiver.

It is therefore an object of this invention to provide a new and improved method and apparatus for providing a renewable surface heliostat type solar mirror.

It is another object of this invention to provide a heliostat solar mirror in which the mirror surface can be selectively changed or renewed periodically.

It is another object of the invention to provide a heliostat type solar mirror in which a flexible mirror material may be selectively positioned on the mirror surface.

It is another object of this invention to provide a heliostat type solar mirror that is less expensive to operate, has a selectively replaceable mirror surface, and has a mirror surface that does not have to be cleaned except on rare circumstances.

Other objects and many advantages of this invention will become more apparent upon a reading of the following detailed description and an examination of the drawing wherein like reference numerals designate like parts throughout and in which:

FIG. 1 is a side elevation view of one reflector unit in a typical installation.

FIG. 2 is a view taken on line 2—2 of FIG. 1.

FIG. 3 is a view taken on line 3—3 of FIG. 2.

FIG. 4 is a top plan view of the reflector.

FIG. 5 is an enlarged sectional view taken on line 5—5 of FIG. 2.

FIG. 6 is a view similar to a portion of FIG. 5, showing an alternative edge seal.

FIG. 7 is a view as taken from the right hand side of FIG. 5, showing a further edge arrangement.

FIG. 8 is an enlarged sectional view taken on line 8—8 of FIG. 4.

FIG. 9 is a view similar to FIG. 8, showing an alternative drive for the reflector.

FIG. 10 is an enlarged sectional view of the reflector and support, showing an electro static method for holding the reflector in place.

FIG. 11 is a diagram of the reflector operating system.

Referring now to the drawings and to FIGS. 1, 2 and 3, the heliostat type solar mirror has a mirror support member 14 on which is mounted a flexible mirror material 68. This mirror material 68, see FIGS. 5 through 10, may comprise any suitable flexible mirror material and specifically may be a Mylar film having a metallized mirror surface thereon. The mirror surface has a reasonable life under the elements involved including dew and sunlight. The support surface 14 has motor operated reels at each end of the curved planar surface, which are located in housings 36 and 40. The motors 38 and 42 rotate the reels for positioning the given portion of the flexible mirror material onto the surface of the support means 14. For example, the reel motor 38 may be the rewind motor and motor 42 the wind motor. The motors 38 and 42 cooperate to either position new material onto the surface of the support means 14 or to replace the new mirror material with older and previously used flexible mirror material, such as at night.

The support member 14 includes a sheet holding means for holding the flexible sheet material in adherence to the surface. In one embodiment, see FIGS. 5 through 9, the support means comprises a honeycomb panel having enclosed cells 78 that communicate with an isogrid of holes 80 through the upper surface of the support means 14. Apertures 82 in the walls of the cells 78 provide air communication between the cells. A blower 70 is positioned in a housing 44 with an opening 76 to the cells 78. The blower draws air through the apertures 80 and through openings 82 and discharges the air through the hole 72 around flapper valve 74. When the flexible mirror material 68 is in position, this material closes holes 80 allowing a negative pressure condition to be created by blower 70 in the cells 78 and holes 80. This creates a suction force on the flexible mirror material 68 across the entire upper surface of the support member 14 that secures or adheres the flexible mirror material against the surface with the mirror configuration of the surface. When blower 70 has created the desired vacuum in cells 78, a known pressure sensing device 75 detects the negative pressure limit and shuts down the blower 70 before the blower creates sufficient suction force through apertures 80 that will damage the flexible mirror material 68. Flapper valve 74 closes off hole 72 to maintain the negative pressure condition. When a given lower limit of negative pressure is reached, then detector 75 reenergizes blower 70 to return the negative pressure in cell 78 to the desired higher limit. Thus, a given negative pressure range is maintained across the upper surface of the support means 14.

In another embodiment, see FIG. 10, the support member 14 is a conductor 104. The flexible mirror material comprises an insulative base 106, with an electrically conductive, metallized, mirror film surface 108. A suitable potential through an electrical circuit 110 and switch 112 is applied to the respective conductor surfaces creating an electro-static field and creating the adherence force between the sheet material 68 and the support plate 104. This creates sufficient force to hold the flexible mirror material into adherence with the upper surface of the support member 104. The electrical circuit is selectively energized and de-energized, thus selectively releasing the adherence of the flexible mirror material 68 to the surface of the support means 14 and allowing the reel motors 38 and 42 to move the film material as desired.

The mirror material 68 is wound at each end on a reel 87 having a shaft 86, and end flanges 91, as in FIG. 6. The flange 91 has circumferential notches 114 to receive a detent 116 actuated by a solenoid 118, to lock the reel once the mirror material is positioned as required. It is also desirable to maintain a light tension on the flexible material, so that the surface does not become wrinkled or uneven and reduce the reflective efficiency. This is accomplished by a tension roller 120 mounted in housing 40 on a spring biased arm 122 to bear against the material. A similar arrangement, but for reverse rotation, is installed in housing 36 for two way movement of the mirror material.

The operation of the reel motors 38 and 42 are automatically controlled by timing means, illustrated in FIG. 11. In general, it is desirable to move a new portion of the flexible mirror material 68 onto the surface of support means 14 whenever the mirror material has become sufficiently deteriorated. However, it is also desirable that the new mirror surface only remain on the support surface 14 during times when actual reflection of solar energy is desired. At other times, the older and prior used surface of the flexible material can be inserted onto the support surface 14. This would, for example, be at night, during storms or at other times when the film surface may be damaged by storms, elements, dew or the like. It is not necessary that the newer and better surface be subjected to such elements, and this movement will lengthen the life of the flexible mirror surface. In doing this, the rewind reel is rewound a sufficient number of revolutions to wind back the exact desired length of the previously used flexible mirror material. To aid in this, see FIG. 9, a capstan roller 90 holds the material 68 against a measuring roller 92 connected to a known measuring device 94. This is used in connection with the control circuit of FIG. 11 to maintain exact positioning of the flexible material, notwithstanding the difference in size of the reflective feed diameters because of reeling on and off of lengths of the flexible mirror material.

The heliostat array is often subjected to high winds. To protect the surface edges against lifting by such winds, longitudinal lip members 62, see FIG. 5, are positioned along the sides of the support means 14, and prevent wind from getting under the edge of the sheet material 68. It is possible in sandy areas such as on deserts and the like that there could be an accumulation of sand and dirt within the cavity of the lips 62, which accumulations could make it difficult to move the sheet material 68. In the embodiment of FIG. 6, a resilient edge member 84 is secured to lip 62 that presses down against film 68 and prevents the entry of dirt, sand or the like into the restricted space defined by the lip. In another approach, see FIG. 7, the lower end of support member 14, see FIG. 1, has a slotted lip arrangement with lip portions 98 having slots 101 therebetween and turbulence generating projections 103 thereon. This creates a wind fence that reduces the ability of wind to lift the edge surface of the flexible material 68 while at the same time providing slots through which dirt and sand particles can move out from under the lip portions 98. It is understood that the reel housings 36 and 40 are enclosed to prevent wind contact of the flexible mirror material 68 in passing from the surface of support member 14 to reels 87.

In positioning the heliostat, see FIGS. 1, 2, 3 and 11, the support means 14 is supported on a pair of V-shaped support legs 32 and 34, with a pivotal connection 58 at the apex thereof that secures the respective legs 32 and 34 to a U-shaped member 20. U-shaped member 20 is supported at each end by means of rollers 54 and 56 for rolling movement along the arcuate T-rail 16.

It is necessary to continuously move the angle of the support member 14 with movement of the sun. This is accomplished by a motor operated screw mechanism 46 that is supported on a support member 60 and has a rotatable screw 50 that coacts with a pivotal member 52. Operation of the screw member 50 continuously pushes the support surface 14 in one direction around the pivotal connection 58. Accordingly, during the daytime, screw 50 gradually moves outwardly rotating the support member 14 in a counterclockwise direction. At night, screw 50 moves in the opposite direction, rotating the support member 14 in the clockwise direction within limits established by the control mechanism. The pivotal member 60 is supported on T-rail 17 by a U-shaped channel member 21 that has a structure and rolling support means similar to that of channel member 20. The two channels members 20 and 21 are connected by a pair of brace members 48 to form an integral frame.

It is also necessary because of the movement of the sun in the north and south direction, that the support means 14 be rotated vertically. This is accomplished by screw member 28 that is rotated inwardly and outwardly in conjunction with a pivot holding means 30 that exerts the required force on the channel members 20 and 21 to move the heliostat along the arcuate rails 16 and 17. The pivotal end 24 of the motor operated screw mechanism 22 is secured to a bracket 26 on one end of the T-shaped rail member 17. The arc of the rails 16 and 17 and the length of the channel members 20 are such that movement of the channel member 20 and 21 along the rails always hold the focal length 15 between the mirror surface of the support means 14 and the receiver 12 at a constant focal length.

In operation, see FIG. 11, the timer and reflector advance and rewind control 100 is a known programmed circuit in which the motors 38 and 42 are operated at given time controlled sequences to move the respective portions of the flexible mirror material 68 onto and off of the support surface of the support means 14. The control 100 actuates solenoids 118 to release the reels 87 each time the motors are to be operated. At the same time, the control 100 also provides a release signal to the mirror surface holding control 102 wherein a solenoid mechanism 71, see FIG. 5, opens the flapper valve 74 and also de-energizes the motor 70, thus releasing the holding negative pressure on the flexible sheet material 68. In the embodiment of FIG. 10, the mirror surface and hold control operates a relay switch to open the switch 112 of the electrical circuit 110. Thus, the reel motors 38 and 42 move the film in the manner desired. When the film has moved the desired amount, then limit switches detect this positioning and through the timer and reflector advance and rewind control 100 sends a signal through the mirror surface hold control 102 that de-energizes relay 71 and opens the switch to the motor 70, see FIG. 5, and in the device in FIG. 10 closes the switch 112.

The sun synch control 105 is separately maintained under a controlled clock arrangement to provide the motor 47 with the controlled power to operate the screw device 46. The motor control for the screw device 22, not shown, is operated only periodically as the change in angle in the vertical direction is only slight for the entire year.

Having described our invention, we now claim:

1. A renewable surface heliostat type solar mirror comprising:
   a sheet of flexible mirror material having at least one mirror surface for reflecting solar light,
   a support means comprising a housing having a substantially planar surface for supporting at least a portion of said sheet material with said mirror surface on the outside,
   sheet holding means for selectively adhering said sheet material against the surface of said support means,
   said support means having a surface shape and curvature whereby said mirror surface directs solar light toward a receiver,
   sheet moving means positioned in said housing for selectively moving and changing the flexible mirror material on said support member, whereby new mirror material selectively replaces used mirror material,
   control means for de-energizing said sheet holding means and energizing said sheet moving means for changing the flexible mirror material and then re-energizing said sheet holding means,
   and said housing having surface edges with a lip extension enclosing the ends and sides of said sheet mirror material for reducing wind lifting of the sheet material from the support surface.

2. A movable surface heliostat type solar mirror as claimed in claim 1 wherein:
   the surface of said support means having a plurality of holes spaced across the surface thereof,
   and said sheet holding means comprising vacuum means for creating a less than atmospheric pressure in said holes and against the surface of said sheet material adjacent the surface of said support means.

3. A renewable surface heliostat type solar mirror as claimed in claim 2 wherein:
   said support means having a plurality of enclosed cells,
   said holes in said surface being in an isogrid arrangement and communicating with respective ones of said cells,
   and said vacuum means creating said less than atmospheric air pressure in each of said cells.

4. A renewable surface heliostat type solar mirror as claimed in claim 3 wherein:
   said cells having a back wall and side walls,
   said side walls having apertures that communicate with adjacent cells,
   a blower means for drawing air from a central aperture through said rear wall,
   and a check valve in the discharge line of said blower means for maintaining the less than atmospheric air pressure in said cells.

5. A renewable surface heliostat type solar mirror as claimed in claim 4 including:
   pressure sensitive means for determining air pressure in said cells,
   and means responsive to said pressure sensitive means for energizing and de-energizing said blower means.

6. A renewable surface heliostat type solar mirror as claimed in claim 1 wherein:
   said mirror surface comprising an electrical conductor that is adhered to a base insulator material,
   said material being adjacent said support means surface,
   said support means surface being electrically conductive,
   and electrical means for imposing an electro-static field across said support means surface and said mirror surface adhering said sheet of flexible mirror material to said planar surface of said support means.

7. A renewable surface heliostat type solar mirror as claimed in claim 6 including:

means for selectively opening and closing said electrical means, and said electrical means generating charged ions onto the surface of said conductive mirror surface whereby dust particles are repelled from the mirror surface.

8. A renewable surface heliostat type solar mirror as claimed in claim 1 wherein:

said sheet moving means comprising motor operated reel means for moving said flexible mirror material and distributing said mirror material over said support means surface, and said control means selectively operating said reel means and de-energizing said sheet holding means for moving said sheet material across the surface of said support means.

9. A renewable surface heliostat type solar mirror as claimed in claim 8 wherein:

said reel means including means for maintaining a slight tension on said flexible mirror material distributed across the surface of said support means.

10. A renewable surface heliostat type solar mirror as claimed in claim 1 in which:

said sheet of mirror material having substantially straight side edges, said surface of said support means having edges aligned along and adjacent to the edges of said flexible mirror material, and said surface edges having a lip extending along the length thereof for enclosing the edges of said mirror material.

11. A renewable surface heliostat type solar mirror as claimed in claim 1 wherein:

said edge lips having a resilient member that presses downwardly against the surface of said flexible mirror material adjacent the side edges thereof for preventing accumulations of dust in the enclosed space of said lips.

12. A renewable surface heliostat type solar mirror as claimed in claim 1 including:

means for placing a charge on the mirror surface of said flexible mirror material that repels the accumulation of dirt particles and the like thereon.

13. A renewable surface heliostat type solar mirror as claimed in claim 1 including:

means for selectively operating said sheet moving means for moving a substantially new surface of said flexible mirror material onto said surface support means at daylight and for moving a portion of a prior used sheet of flexible mirror material onto said surface of said support means in the evening.

14. A renewable surface heliostat type solar mirror as claimed in claim 1 wherein:

said support means and mirror including support legs, means for pivoting said support legs and said mirror in slight amounts allowing said mirror to track the movement of the sun, and means for gradually pivoting said support means and said legs in one direction throughout each day and for moving the support means and legs in the opposite direction back to the original position throughout each night.

15. A renewable surface heliostat type solar mirror as claimed in claim 1 including:

a curved track, means for securing said support means onto said curved track for up and down angular movement, and means for moving said support means on said curved track surface to maintain orientation of said mirror surface relative to changes in movement of the sun.

16. A renewable surface heliostat solar type solar mirror as claimed in claim 15 wherein:

said track is curved and said legs are attached for movement on said track in spaced positions thereon to maintain the center of said surface of said support means at a given focal length from the receiver.

17. A renewable surface heliostat type solar mirror as claimed in claim 1 wherein:

at least one of said lips having spaced slots therein with alternate narrow portions and slots with an upward projection on each of said narrow portions between said slots forming a wind fence adjacent the edge of the flexible mirror material.

18. The method of providing a renewable surface heliostat type solar mirror comprising the steps of:

placing a portion of a sheet of flexible mirror material having at least one mirror surface for reflecting solar light onto a support means having a substantially planar surface with said mirror surface on the outside for focusing the solar light onto a receiver, selectively adhering the sheet material to the support surface, selectively releasing the sheet material from the support surface and moving new portions of the sheet material over the support surface, re-adhering the sheet material to the support surface, and protecting by an enclosing lip edge on the support means the end and side edges of the sheet material on the support means to reduce wind lifting of the sheet material from the support surface.

19. The method as claimed in claim 18 including the step of:

selectively moving the new portions onto said support surface during daylight hours and moving the used mirrored surface onto said support surface during night hours.

20. The method as claimed in claim 18 including the step of:

placing an electrical charge on the mirror surface of the sheet material for repelling dust and dirt particles.

21. The method as claimed in claim 18 including the steps of:

adhering the sheet material to the support surface creating a less than atmospheric pressure in apertures in the support surface.

22. The method as claimed in claim 18 including the steps of and being characterized by:

said flexible mirror material having an electrical conducting outer mirror surface and an insulative support surface, said support surface being electrically conductive, and setting up an electrical field across the mirror surface and the support surface causing the sheet of flexible mirror material to adhere to the support surface.

* * * * *